Sept. 9, 1958  G. NATTA ET AL  2,851,486
PREPARATION OF SUCCINIC ACIDS
Filed March 23, 1956
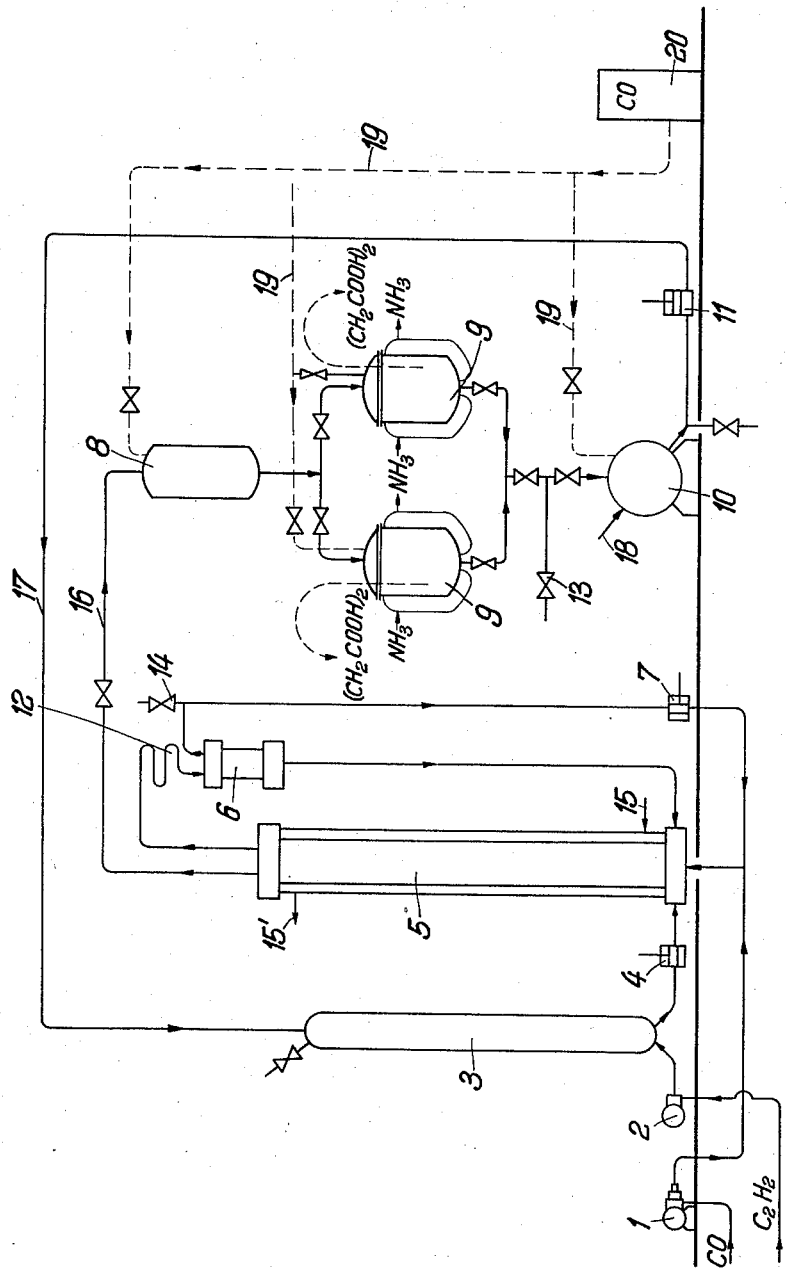

United States Patent Office 2,851,486
Patented Sept. 9, 1958

2,851,486

PREPARATION OF SUCCINIC ACIDS

Giulio Natta and Piero Pino, Milan, Italy, assignors to Lonza Electric and Chemical Works Ltd., Basel, Switzerland Application March 23, 1956, Serial No. 573,444

Claims priority, application Switzerland March 25, 1955

10 Claims. (Cl. 260—515)

The invention relates to the preparation of compounds of the general formula

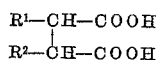
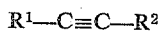

wherein $R^1$ and $R^2$ are hydrogen, alkyl, or aryl.

According to the invention, mono-acetylene compounds of the formula $$R^1-C \equiv C-R^2$$

wherein $R^1$ and $R^2$ have the same significance as above, are reacted with carbon monoxide and water at temperature of 80° to 250° C. and pressures of 30 to 500 atm. in acid medium. The reaction proceeds substantially according to the equation

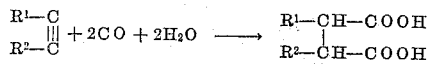

and is carried out in a solvent in the presence of a catalyst comprising carbonyl compounds of such a metal of the eighth group of the periodic system, which is capable of forming carbonyl compounds of the type $Me_m(CO)_n$, $m$ being greater than 1. The solvent must be able to dissolve the acetylene compound as well as water, and the catalyst.

Suitable mono-acetylene compounds are, in addition to acetylene, substituted derivatives thereof, such as, for example: ethyl acetylene, phenyl acetylene, diphenyl acetylene.

Examples of metals of the eighth group of the periodic system, which are able to form carbonyl compounds of the type $Me_m(CO)_n$, wherein $m > 1$, are listed in the following table.

| Metal | m=1 | m=2 | m=3 | m=4 |
|---|---|---|---|---|
| Fe | Fe(CO)₅ | Fe₂(CO)₉ | Fe₃(CO)₁₂ | — |
| Co | — | Co₂(CO)₈ | — | Co₄(CO)₁₂ |
| Ru | Ru(CO)₅ | Ru₂(CO)₉ | Ru₃(CO)₁₂ | — |
| Os | Os(CO)₅ | Os₂(CO)₉ | — | — |
| Ir | — | Ir₂((CO)₈ | — | — |

Such carbonyl compounds, in which $m$ is greater than 1, may be directly introduced in the reaction or may be formed during the reaction from other metal compounds or from the simple carbonyl compounds ($m=1$). Among the metals of the eighth group, particularly those of the fourth period, that is Co and Fe, are suitable; the other metals of the eighth group are noble metals which, because of their high price, are less suitable for commercial use. When derivatives of these metals are used, which in the reaction conditions form carbonyl complexes containing more than one metal atom in the molecule, very efficient catalysts are formed, which favor particularly the synthesis of succinic acid and substituted succinic acids (called hereafter "succinic acids"). Cobalt carbonyl compounds are particularly suitable, but iron compounds, especially iron carbonyls, may also be used. Nickel, however, which does not form carbonyl compounds wherein $m > 1$, is not an efficient catalyst for the present reaction and cannot be used as a catalyst component. We have found that in the addition reaction of carbon monoxide to acetylene compounds, the nickel catalysts mostly used heretofore are not suitable to effect the synthesis of succinic acids in a neutral to acid medium according to this invention. As will be noted on considering Example 6 below, nickel catalysts produce in a neutral to acid medium compounds which contain no succinic acids or only very small amounts thereof, while a large part of the CO is converted to $CO_2$.

Solvents must be used which are miscible with water and which dissolve acetylene. Suitable solvents are aliphatic and alicyclic ketones, for example acetone, methyl ethyl ketone, cyclopentanone, or ethers such as, for example, ethyleneglycol dimethyl ether, dioxane, and the like.

In aqueous medium without addition of the above recited solvents, the reaction proceeds at a satisfactory rate only at temperatures above 140° C.; at these high temperatures, however, also small amounts of other products (carbonyl compounds) are formed, and part of the CO is converted to $CO_2$. In addition, the catalyst loses very quickly its catalytic activity.

When, according to the invention, the reaction is carried out in the presence of a large excess of an organic solvent over the water employed, and when further an excess of water over its theoretical amount (for instance 2.5 moles of $H_2O$ per mole of $C_2H_2$) is used, the reaction takes place at 100° C. and proceeds quickly at 110 to 120° C.

The use of an organic solvent, in which acetylene is readily soluble, allows of carrying out the reaction at high weight ratios of solvent to water with high acetylene concentrations in the liquid phase and at relatively low partial pressures of acetylene. The solubility of the catalyst, for instance $[Co(CO)_4]_2$, in the solvent permits operating in a liquid homogeneous phase under conditions where the catalyst retains its activity for a long time.

The time required for completing the reaction may be some minutes to several hours and is a function of the specific acetylenic compound employed, and of the temperatures and pressures used. The formation of unsubstituted succinic acid from $C_2H_2$, $H_2O$ and CO at 200 atm. and about 110° C. is completed, for instance, after 30 minutes with a yield of more than 60 percent of the theory.

Of particular interest is the fact that the reaction, which takes place within a wide temperature interval, for instance between 80° and 200° C., may be carried out with yields at temperatures below 120° C., for instance between 100° and 120° C. At such temperatures, the conversion of CO to $CO_2$ proceeds very slowly (for instance only 2 to 3 percent of the introduced CO forms $CO_2$); in addition, the corrosive attack of the obtained acids on the metallic walls of the apparatus is considerably reduced.

The methods known heretofore for the preparation of succinic acid comprise at least two stages according to the equations (1)

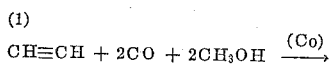

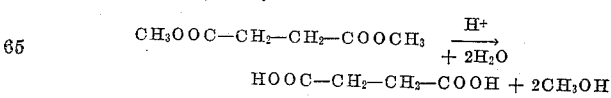

(2)

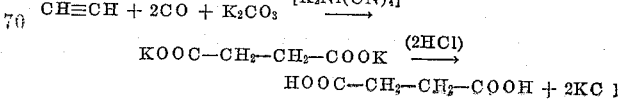

In these reactions, the yields calculated on acetylene are generally very low (for instance 35 percent in Reaction 1), due to the formation of numerous by-products. In Reaction 1, the yields are further particularly low with respect to methanol (35–40%), and in Reaction 2 with respect to carbon monoxide, of which a considerable portion is converted to carbon dioxide.

The reaction according to the invention can be carried out in a single homogeneous liquid phase, which contains the catalyst, the solvent, the water and the acetylenic compounds. The catalyst is added preferably in amounts of 2 to 7 parts by weight for 100 parts by weight of solvent. Particularly high yields are obtained by employing an excess of solvent, for instance two to twelve times the amount of the water used. The reaction can be carried out in an autoclave containing the acetylene solution, water, and catalyst, into which carbon monoxide is introduced until an elevated partial pressure of CO (for example more than 30 atm.) and an acetylene pressure is obtained, which is still below the explosion limit. The autoclave is then heated at the required temperature. Under such conditions, especially when the reaction is carried out with cobalt carbonyl compounds such as $[Co(CO)_4]_2$, succinic acid is obtained in a single reaction step in yields of more than 60 percent, calculated on acetylene, in the form of reaction products containing more than 60% of the free acid. The invention provides, therefore, a simple and economic method for the preparation of succinic acid, which is an important starting material for organic syntheses.

The succinic acid is separated from the reaction product by cooling and crystallization; a relatively pure acid, which is suitable for many applications, may be obtained by distilling off the volatile solvent and causing the remaining aqueous solution to crystallize.

In a preferred embodiment of the invention, the reaction is carried out continuously. An apparatus suitable for such a continuous process is illustrated, by way of example, in the accompanying schematic diagram.

In the drawing, the reference numerals 1 and 2 designate compressors for carbon monoxide and acetylene, respectively. The compressed acetylene is passed upwardly through an absorption column 3 in countercurrent to the circulating solvent. The obtained $C_2H_2$ containing solution is withdrawn from the bottom of the column 3 and passed through the compressor 4 into the reactor 5, where it receives the carbon monoxide from the compressor 1. The reactor is provided with a heating jacket through which heating fluid entering at 15 is circulated. The unreacted carbon monoxide is discharged from the top of the reactor and is returned thereto by means of the pump 7 after passing through the cooler 12. Circulating solution which separates out in the cooler 12, is collected in the vessel 6 and returned from said vessel to the bottom of the reactor 5.

The solution of the reactants passes through the line 16 into an expansion vessel 8 and from there with a temperature high enough to prevent crystallization alternately into one of the filters 9, where succinic acid is precipitated and removed. The remaining solution is recycled through the vessel 10, pump 11, and line 17 into the absorber 3. Fresh water, solvent and catalyst are introduced into the vessel 10 through inlet 18 to replace the amounts consumed or lost during the reaction. Portions of the gases and liquids may be withdrawn through valves 13 and 14, respectively, in order to prevent accumulation of inert gases (for instance $N_2$, $H_2$) and of secondary reaction products (for instance, propionic and acrylic acid, cyclopentanone) in the apparatus.

A CO gazometer 20 supplies carbon monoxide through the line 19 to the vessels 8, 9 and 10 to provide therein an atmosphere of carbon monoxide. The carbon monoxide atmosphere maintains the efficiency of the catalysts in the solution, and the separation of the succinic acids, the addition of acetylene or mono-acetylene compounds to the mother lyes, the re-saturation of the solutions with acetylene at 2 to 20 atm. pressure, and the recycling of the solutions are therefore carried out in such CO atmosphere in the absence of oxygen. The partial pressure of the carbon monoxide should exceed the decomposition pressure of the catalytic metal carbonyl compounds contained in the solution. Said required partial pressure depends on the temperature at which the recited manipulations are carried out. For instance, at a temperature of 0° C., a pressure of about 1 atm. is sufficient, whereas at higher temperatures preferably higher CO pressures are employed, for instance about 3–10 atm. for temperatures of 10–30° C. and 20–30 atm. for temperatures of 50–80° C.

The saturation of the recycled mother lye with acetylene in the carbon monoxide atmosphere is preferably carried out until a partial pressure of the acetylene of 2–20 atm. has been reached. The partial pressure of CO is at least 0.2 atm.

We have found that the activity of the catalyst in the synthesis decreases quickly with increasing concentration of succinic acids in the reacting solution; in the case of succinic acid, for instance, its concentration in the solution should not exceed 30 to 35 percent by weight. It is, therefore, of advantage to work with low concentrations; this may be accomplished by adjusting the rate and amount of withdrawal of the reaction product from the reaction vessel.

Even though the last-mentioned condition may be observed, a slow decrease of the catalyst activity may sometimes take place. In such a case, fresh metal carbonyl has to be added to the reacting solution, or the metal salt of the succinic acid remaining in the solution after separation of the succinic acids, for instance cobalt or iron succinate may be converted by carbon monoxide and hydrogen at a temperature of 120 to 200° C. to cobalt or iron carbonyl, respectively.

Similarly, if the metal compounds are available as salts of succinic acids, they may be suspended in the solvent to be added and converted therein by carbon monoxide and hydrogen into the carbonyl compounds.

For the continuous synthesis of succinic acids according to the invention, we have found it of advantage to use cyclopentanone as solvent. Cyclopentanone is formed in the synthesis reaction itself as a by-product and need not therefore be purchased. It has the further advantage of having a high boiling point, so that losses by evaporation are very low.

The following examples are given to illustrate preferred methods of carrying out the invention, it being understood that the invention is not limited to the details given therein. It will be noted that only Examples 2–5 and 7–8 are representative of the process of the invention; Examples 1 and 6 are given as comparative tests to show the unsatisfactory results obtained when critical steps of our novel method are omitted. In the examples, the term "reaction products" is used to designate the total amount of obtained succinic acids, monocarboxylic acids, and keto compounds.

*Example 1*

This example does not illustrate the invention as no solvent is used. It is given as comparison to the following examples, where the reaction is carried out in a solvent medium according to the invention.

100 g. of water containing 10 g. of dicobalt octacarbonyl in aqueous suspension are placed in an autoclave of 300 cu. cm. capacity. Then 2.5 n. l. (=liter under normal conditions) of acetylene are introduced and subsequently carbon monoxide is forced in until a total pressure of 200 atm. obtains. The autoclave is heated to 40° C. and the temperature is slowly raised to 140° C. After about 6 hours, the autoclave is cooled, and the gases are withdrawn and analyzed. About 4.6 percent of the CO has been converted to $CO_2$, while 10 percent of the CO has reacted with acetylene.

The liquid products are discharged from the autoclave and distilled. The residue of the distillation is taken up with water, and after removal of the cobalt 2 g. of succinic acid are obtained by crystallization. The yield is 16.5 percent, calculated on initially introduced acetylene.

*Example 2*

216 g. of acetone, 72 g. of water and 10 g. of dicobalt octacarbonyl are placed in an autoclave of 1710 cu. cm. capacity. Subsequently 14 n. l. of acetylene are introduced, and then carbon monoxide is gradually forced into the autoclave until a pressure of about 200 atm. is obtained. Then the autoclave is heated at 110° C. for 3 hours, whereupon it is cooled to room temperature and the gases are released. The analysis of the gases shows that 6.2 percent of the CO has been converted to $CO_2$.

The liquid reaction product, which contains some succinic acid in suspension, is then withdrawn from the autoclave, and after filtration the acetone and part of the liquid is distilled off. Together with the water, there are distilled off a small amount of an oily compound, which can be identified as cyclopentanone, and 3.8 g. of a mixture of acrylic and propionic acid. The residue consists substantially of succinic acid; on dissolving and recrystallization, 60 g. of said acid are obtained. The total yield of succinic acid, calculated on acetylene, exceeds 80%.

*Example 3*

36 g. of water, 90 g. of dioxane, and 4 g. of dicobalt octacarbonyl are placed in an autoclave of 310 cu. cm. capacity. 9.5 n. l. of acetylene are introduced, and then carbon monoxide is forced in until a pressure of 200 atm. has been reached. The autoclave is heated at 110° C. for 5 hours, whereupon it is cooled to room temperature and the gaseous products are released.

The liquid products are distilled. The distillate contains 1.59 g. of carbonyl compounds essentially in the form of cyclopentanone, and 4 g. of a mixture of acrylic and propionic acid containing more than 60 percent of acrylic acid.

The distillation residue is composed almost entirely of succinic acid. By dissolving it again and recrystallization, 32.5 g. of succinic acid are obtained. The yield of succinic acid, calculated on acetylene, is 65%.

*Example 4*

10 g. of $[Co(CO)_4]_2$, 90 g. of water, 198 g. of acetone, and 0.294 mole of phenyl acetylene are introduced in a swinging autoclave of 1710 cu. cc. capacity. After the air has been expelled by repeated sweeping with carbon monoxide, 200 atm. of carbon monoxide are forced into the autoclave, which is then heated, with continuous motion, to 140° C. After said temperature has been reached, a decrease in the pressure is observed, which stops after about 4 hours. Subsequently the autoclave is left to cool down to about 20° C. Then the gases are released, and the reaction products are taken out of the autoclave. The liquid products (about 332 g.), which show an acid reaction, are distilled at normal pressure and at temperatures between about 55–100° C. The distillation residue is treated with alkali and the non acidic compounds extracted with ether, then acidified, whereby .0074 mole of phenyl succinic acid (racemic) having a melting point of 166° C. are obtained. The yield of phenyl succinic acid with regard to the employed phenyl acetylene was about 25 percent, with regard to the carbon monoxide about 57 percent.

*Example 5*

An autoclave as used in the preceding example was filled with 10 g. of $Fe(CO)_5$, 90 g. of water and 199 g. of acetone. After sweeping with carbon monoxide, 0.762 mole of acetylene are introduced, and carbon monoxide is forced in until a pressure of 200 atm. is obtained; then the swinging autoclave is heated at 180° C. A gradual decrease in the pressure is observed, which stops after about 4 hours. The autoclave is then left to cool to about 20° C. The gases are released, and about 320 g. of a mixture are withdrawn from the autoclave. Said mixture shows acid reaction and contains, in addition to the solvents and catalyst, 27.382 g. of reaction products. The mixture is distilled at ordinary pressure at temperatures of 55 to 100° C. The distillate contains 4.082 g. (0.0552 mole) of monocarboxylic acids (propionic and acrylic acid), corresponding to 10.95 percent of the acetylene; in addition, it contains 3 g. (0.0357 mole) of cyclopentanone, corresponding to 14.2 percent of the acetylene. The distillation residue contains 20.3 g. (0.1725 mole) of succinic acid, corresponding to 34.2 percent of the acetylene. The analysis shows that 34 percent of the acetylene is still present in the gaseous phase after the reaction. The reaction products contain about 74 percent of succinic acid.

The following example shows the results obtained when the catalysts according to the invention are replaced by nickel carbonyl.

*Example 6*

The autoclave used in Example 2 is filled with 10 g. of $Ni(CO)_4$, 90 g. of water, and 198 g. of acetone. After sweeping with carbon monoxide, 0.961 mole of acetylene is introduced. Then carbon monoxide is forced in with a pressure of 200 atm. The swinging autoclave is heated, and an absorption of carbon monoxide, as shown by the pressure drop, takes place only above 200° C. The autoclave is kept in motion for about 4½ hours at temperatures between 200 and 217° C. Then the autoclave is cooled to about 20° C. The released gases contain about 15.4% of acetylene, which has not reacted. The liquid has acid reaction and contains 0.737 mole of monocarboxylic acid and 0.033 mole of monocarbonyl compounds. The acids are converted to sodium salts; 50 g. of a mixture of acrylic and propionic acid, corresponding to about 0.68 mole of monocarboxylic acid, are obtained from said salt by acidification and extraction with ether, followed by distillation. A portion of the acrylic acid polymerizes during said treatment and is impossible to recover. No succinic acid can be isolated from these products.

*Example 7*

The autoclave used in the preceding example is filled with 7.13 g. of cobalt succinate, 251 g. of acetone, 45 g. of water and 0.270 mole of acetylene. A mixture of CO and $H_2$ in the proportion of 4:1 is introduced into the autoclave with a pressure of 250 atm. and the autoclave is continuously shaken and then heated. The absorption starts at 170° C. and is terminated after about 5 hours. After cooling to room temperature, the gases are released. Their analysis shows that all the acetylene has reacted. 320 g. of a liquid are withdrawn from the autoclave; said liquid contains about 18.1 g. (0.1535 mole) of succinic acid, corresponding to a yield of 45.5 percent, calculated on the introduced acetylene; the succinic acid introduced by the cobalt succinate has been deducted. In addition, the liquid contains 3.01 g. (0.0406 mole) of propionic and acrylic acid, corresponding to a yield of 15 percent of the introduced acetylene, and traces of carbonyl compounds. The reaction products comprise about 22 g., of which 18.1 g. are succinic acid, corresponding to a content of about 80 percent.

*Example 8*

This example illustrating a continuous procedure will be described with reference to the accompanying drawing:

A mixture containing 90 percent of $C_2H_2$, 5 percent of CO, and 5 percent of other gases (such as $N_2$, $CH_4$, $H_2$, etc.) is compressed by compressor 2 to a pressure of about 8 atm. over atmospheric pressure, and passed from below into the absorption column 3. The latter receives at its top the recycled solution coming from the separator 9, containing cyclopentanone, succinic acid, and small amounts of propionic and acrylic acid, in addition to carbonyl compounds of cobalt. The thus obtained $C_2H_2$ containing solution leaves the column at its lower end; it is compressed by compressor 4 to about 300 atm. and introduced into the reactor column 5. The CO required for the reaction is compressed by compressor 1, also to about 300 atm. and introduced into the reactor column 5. The latter is so dimensioned that the reacting solution remains therein for about 1 hour. The reaction column 5 is maintained at a temperature of 110 to 120° C. by means of a circulating liquid entering an encircling heating jacket at 15. The unreacted CO is released at the head of the reactor column and recycled into the reactor after passage through the cooler 12 and pump 7.

The reacting solution is withdrawn at the upper part of the reactor column 5 and expanded in vessel 8 to a mean pressure of 20 to 30 atm., whereby the solution is kept hot enough to prevent crystallization. Then the solution is drained into the filter 9 and therein cooled to 0° C. by means of liquid ammonia. The precipitated succinic acid is alternately withdrawn from the two filters and rinsed with acetone. The mother lye is returned into the absorption column 3 by means of a pump 11. The water required for the reaction as well as solvent and catalyst for replacement of losses are admixed to the returning mother lye on its passage through the vessel 10 through the inlet 18.

Part of the gases and liquid is withdrawn through the cocks 13 and 14 in order to prevent accumulation of inert gases (for instance $N_2$, $H_2$), and of secondary products (for instance propionic and acrylic acid, cyclopentanone).

The devices 8, 9, and 10 are kept continuously under a CO atmosphere by connecting them to a CO gazometer 20 through a line 19.

*Example 9*

In this example the reaction takes place in dioxane as solvent. In an autoclave of 310 cm.³ capacity, 90 g. of dioxane, 36 g. of water and 10 g. of dicobaltocta-carbonyl are introduced. The air is evacuated and the solution is saturated with acetylene, having a pressure of 5 atm. Hereafter carbon monoxide is added until a pressure of 200 atm. is obtained and the autoclave is then heated, with stirring, to 110° C. At 90° C. the pressure starts falling, which pressure drop ends after 2 hours.

Once cooled, the autoclave is emptied of the gases, whereupon a second batch of acetylene and CO is introduced and, the reaction is resumed as described before. All together the operation is repeated four times, corresponding to 14 NL acetylene (0.62 mole). The gaseous products are withdrawn and analyzed; about 1.2 liters of the CO introduced is transformed into $CO_2$. Finally the liquid products are taken from the autoclave and distilled.

The first fraction, to distill up to 100° C. contains 0.05 mole mono-carboxylic acids.

The residue contains 48 g. (0.407 mole) succinic acid corresponding to a yield of 65%, calculated on the introduced acetylene. After removal of the carbonylic products the first fraction is neutralized with N/2 caustic soda and distilled. The total content of carbonylic compounds in the distillate, expressed in cyclopentanone, is of 2.59 g.

*Example 10*

In this reaction cyclopentanone is used as solvent for acetylene, CO and water.

10 g. dicobaltocta-carbonyl dissolved in 248 cm.³ cyclopentanone and 90 cm.³ water are introduced in an autoclave having a capacity of 1710 cm.³.

Thereafter, 13.5 NL (0.51 mole) acetylene are introduced and the pressure is raised to 200 atm. with CO. The autoclave is then heated, while agitating, to a temperature of 110° C. The absorption of CO ends after about 3 hours.

Operating as described hereinabove, 49.6 g. (0.42 mole) of succinic acid are obtained which correspond to 82.4% of the theoretical yield; in addition, the reaction products contain 1.517 g. (0.025 mole) of monocarboxylic acids, expressed as propionic acid. The carbonylic compounds cannot be determined exactly.

*Example 11*

In a pressure vessel having a capacity of 310 cm.³ are introduced 5 g. of $[Co(CO)_4]_2$, 99 g. of acetone, 45 g. of water and 0.0572 mole of diphenylacetylene.

After air has been evacuated, CO is introduced in the autoclave up to a pressure of 150 atm. and the solution is heated with stirring to a temperature of 210–215° C.

After cooling the gases are evacuated and the reaction product is recovered.

The analysis of the reaction products shows that 47% of the introduced diphenylacetylene has been reacted.

From the reaction products, diphenylsuccinic acid is isolated, whose dimethylester has, after three recrystallizations, a melting point of 215–220° C. which corresponds to the melting point of the dimethylester of the meso diphenylsuccinic acid as referred to in the literature.

As acetylene under high pressures is highly explosive, all reasonable precautions must be taken when working with this compound.

What we claim is:

1. A process for the preparation of compounds of the general formula

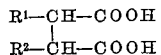

wherein $R^1$ and $R^2$ are members of the group consisting of hydrogen, alkyl, and aryl, comprising reacting a monoacetylene compound of the formula

wherein $R^1$ and $R^2$ have the same significance as above, with carbon monoxide and water in the presence of a carbonyl compound of the type $Me_m(CO)_n$, wherein Me is a metal of the group consisting of cobalt and iron and $m$ is greater than 1, in a solvent dissolving said mono-acetylene compounds, water, and said catalyst, at temperatures of 80 to 250° C. and pressures of 150 to 500 atm. in an acid medium.

2. The process as defined in claim 1, wherein the catalyst is a member of the group consisting of iron and cobalt compounds which under the conditions of the reaction in the presence of hydrogen are converted to the corresponding carbonyl compounds.

3. The process as defined in claim 1, wherein 2–15 parts by weight of solvent are employed for each part by weight of water.

4. The process as defined in claim 1, wherein the solvent is a member of the group consisting of aliphatic and alicyclic ketones and ethers.

5. The process as defined in claim 1 comprising reacting the reactants in a single homogeneous liquid phase containing the catalyst, solvent, mono-acetylene compound, and water.

6. A process for the preparation of products containing more than 60 percent by weight of succinic acid comprising reacting acetylene, carbon monoxide, and water in the presence of a cobalt carbonyl as catalyst in a solvent dissolving acetylene, water, and said catalyst, at temperatures of 80 to 180° C. and pressures of 150 to 500 atm. in an acid medium.

7. A process for the continuous preparation of a succinic acid of the general formula $$R^1-CH-COOH$$
$$R^2-CH-COOH$$

wherein $R^1$ and $R^2$ are members of the group consisting of hydrogen, alkyl, and aryl, comprising introducing in a reaction zone a solution containing a mono-acetylene compound of the formula $$R^1-C\equiv C-R^2$$

wherein $R^1$ and $R^2$ have the significance as above, carbon monoxide, water, and as catalyst a carbonyl compound $Me_m(CO)_n$, where in Me is a metal of the group consisting of cobalt and iron and $m>1$, in a solvent dissolving said monoacetylene compound, water, and catalyst, at temperature of 80 to 250° C. under a pressure of 150 to 300 atm. in an acid medium, withdrawing said solution from said reaction zone, separating at least part of the obtained succinic acid, recycling the remaining solution into said reaction zone, and introducing carbon monoxide and said mono-acetylene compound into said reaction zone.

8. The process as defined in claim 1, wherein 3 to 10 moles of water per mole acetylene is used.

9. The process as defined in claim 1, wherein the solvent is a member of the group consisting of acetone and cyclopentanone.

10. The process as defined in claim 6, wherein the partial pressure of acetylene is comprised between 2 to 30 atm. and wherein the total pressure is about 10 times the acetylene partial pressure.

References Cited in the file of this patent

UNITED STATES PATENTS

| | | |
|---|---|---|
| 2,562,393 | Reppe | July 31, 1951 |
| 2,604,490 | Reppe | July 22, 1952 |